Figure 1:
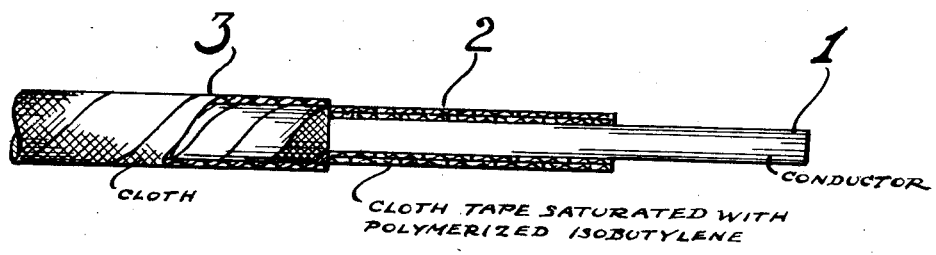

Jan. 31, 1939.  R. T. HASLAM  2,145,350

CABLE INSULATING COMPOSITIONS

Filed Dec. 28, 1933.

Robert T. Haslam Inventor
By J. E. Small Attorney

Patented Jan. 31, 1939

2,145,350

UNITED STATES PATENT OFFICE 2,145,350

CABLE INSULATING COMPOSITIONS

Robert T. Haslam, Westfield, N. J., assignor to Standard Oil Development Company, a corporation of Delaware Application December 28, 1933, Serial No. 704,363

6 Claims. (Cl. 173—264)

This invention relates to cable insulating compositions containing high molecular weight linear hydrocarbon polymers obtained by carefully controlled polymerization of unsaturated hydrocarbons, and methods of incorporating such polymers into cable insulating compositions.

Conductors used for transmission of electrical power are generally coated with an insulating material. For instance, underground transmission of high voltage electrical power is accomplished by the use of impregnated, paper-insulated, lead-covered cables. The impregnating compound used to the greatest extent has been a mixture of mineral oil and rosin. This material had high dielectric losses, especially with a rise in temperature, which were attributed to the impurities in the rosin used. As a result, the composition has been gradually replaced by pure mineral oil or petroleum. The dielectric losses of cables impregnated with certain mineral oils have initially low values, but when the cables undergo service the losses increase, and after a period of years they are as high or even higher than those of cables impregnated with rosin mixtures.

An object of this invention is to provide a cable insulating composition that is stable and maintains its properties under electrical stress, under elevated temperatures, and in the presence of catalysts.

Another object of this invention is to provide a cable insulating composition that is resistant to oxidation and formation of acids, will not sludge, and is free of mineral acids and sulfur.

According to this invention, linear hydrocarbon polymers of about 1,000 to 10,000 molecular weight, depending on the manner in which they are made, are used. These polymers may, in many respects as in nature, form, etc., be considered intermediates between a fluid mineral oil and natural rubber. However, they possess superior proportions in many ways over both these materials. The polymers possess high viscosities and are soluble in mineral oils. They do not become brittle on cooling to low temperatures, such as —20° to —40° F. The polymers are obtained by polymerizing unsaturated hydrocarbons such as isobutylene, and the like. The polymerization of isobutylene is generally carried out below —10° F. with a halide catalyst such as boron fluoride, and in some cases aluminum chloride, titanium tetrachloride, etc., the molecular weight generally being controlled by the purity of the olefine, the type of catalyst, and the temperature of the polymerization. The higher polymers are obtained at very low temperatures and with very pure olefines.

There are a number of different ways in which the above polymers can be used in the cable insulating composition. For example, a 20% solution of isobutylene polymer (6,000 average molecular weight) in naphtha of a boiling range between 175° and 375° F. or in a higher boiling solvent such as one of a boiling range of 100° to 410° F. is prepared. Cloth tape, which has been previously dried at an elevated temperature, is placed in this solution and allowed to soak. It is then removed and the solvent evaporated. This step may be performed a number of times to obtain a tape that is completely saturated and carries a film of the polymer on its surface. This tape is now ready to be used as an insulating material and may be wound around a copper wire or bundle of wires. It is generally advisable to cover the finished wire or bundle of wires (with the cable insulating composition) with a suitable coating material such as unimpregnated cloth or a metal, for example, lead sheathing. This tape may also be used as a friction tape for insulating bare wires or connections of wires. If desired, other adhesive materials may be incorporated therein, though the polymers in themselves are adhesive.

Another method of carrying out this invention is to prepare a solution of the polymer, such as isobutylene polymer of 6,000 average molecular weight, in a mineral lubricating oil. A cable, with the wires wound with paper, is placed in an autoclave and subjected to an elevated temperature and kept under vacuum until all the moisture is removed therefrom. Then the solution of lubricating oil and the polymer is added under pressure and maintained at the elevated temperature until all of the paper is impregnated. This cable is generally protected on the outside by a coating of lead sheathing. The quantity of the polymer used in this composition is from 0.1% to 10% or higher. The mineral lubricating oil preferred is a highly refined mineral oil free of impurities.

Cable insulating compositions are generally required to have Saybolt viscosities of about 90 to 100 seconds at 210° F. These may be prepared by dissolving isobutylene polymers of about 6,000 average molecular weight in lubricating oils having Saybolt viscosities of about 50 to 60 seconds at 210° F. and A. P. I. gravities of about 20. Lubricating oils having higher or lower viscosities may be used and the cable insulating compositions having the desired viscosities prepared by dissolving in the oils greater or lesser amounts of the isobutylene polymers or by dissolving in the oils isobutylene polymers of higher or lower molecular weights.

The accompanying drawing illustrates two modifications of cables made in accordance with this invention. In Fig. 1, polymerized isobutylene alone is shown as the impregnating medium in the insulation layer, where as in Fig. 2 the polymerized isobutylene is used in solution in mineral oil for impregnating the fabric in the insulation layer.

Figure 2:
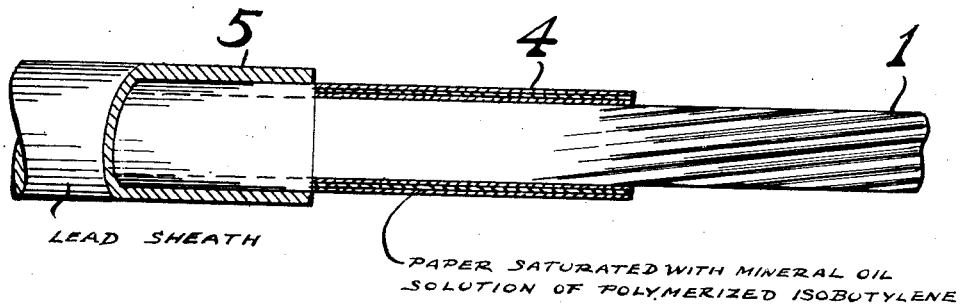

Referring to Fig. 1, the numeral 1 indicates the metallic conductor which is insulated with several layers of cloth tape 2 which has been completely impregnated or saturated with polymerized isobutylene and this, in turn, is covered with an outer layer of plain cloth fabric 3 serving as protection during handling. In Fig. 2 the metallic conductor 1 (here shown as a stranded cable) is insulated with a paper fabric 4 which is saturated with a mineral oil solution of polymerized isobutylene and the insulated conductor is enclosed in a lead sheath 5.

Cable insulating compositions prepared according to this invention are especially suitable for cables used in the underground transmission of high voltage electrical power. The dielectric losses do not increase as rapidly as when mixtures of rosin and lubricating oil or lubricating oil alone are used. The dielectric losses of cables impregnated with these cable insulating compositions have initially low values. The resistivity values of these cable insulating compositions show a slower decrease than mixtures of oil and rosin or lubricating oil alone.

These cable insulating compositions also have the advantages in that they are tacky and tend to stick to a surface after contact is once made and will prevent the formation and extension of voids. The high viscosity tends to prevent leakage before leading and during jointing. These compositions do not become brittle in the cold weather and can be handled without rupturing the insulating composition. They absorb very little air and water and they have a very low rate, if any, of wax formation. Another advantage is the high flash point.

It is not intended that the invention be limited to any of the specific examples hereinabove given or to any theories advanced as to the operation of the invention, but in the appended claims it is desired to claim all novelty in the invention as broadly as the prior art permits.

I claim:
1. An insulated electrical conductor comprising a metallic electrical conductor having an insulating coating comprising a plastic linear polymer of isobutylene having a molecular weight greater than about 1,000.

2. An insulated electrical conductor comprising a metallic electrical conductor having an insulating coating comprising a substantial amount of mineral oil and a substantial amount of polymerized isobutylene having a molecular weight greater than about 1,000.

3. A cable comprising at least one metallic electrical conductor wound with fabric impregnated with a substantially non-oxidizing, plastic, non-hardening linear polymer of isobutylene, said polymer having a molecular weight greater than about 1,000.

4. The method of insulating an electrical conductor which comprises impregnating a fabric with a substantially non-oxidizing, plastic, non-hardening linear polymer of isobutylene, said polymer having a molecular weight greater than about 1,000, and winding the said fabric around a metallic electrical conductor.

5. The method of insulating electrical conductors which comprises winding metallic electrical conductors with paper, subjecting the conductors to an elevated temperature under vacuum, impregnating the paper-wrapped conductors under pressure and at elevated temperature with a solution of a mineral lubricating oil containing dissolved therein a substantial amount of a substantially non-oxidizing, plastic, non-hardening linear polymer of isobutylene, said polymer having a molecular weight greater than about 1,000 and covering the resulting impregnated taped conductors with a sheathing of lead.

6. An insulated electrical conductor comprising a metallic conductor having an insulating coating comprising polymerized isobutylene having a molecular weight of about 6,000.

ROBERT T. HASLAM.